Sept. 3, 1935.    R. CHILLINGWORTH    2,012,988
ROTATING WING SYSTEM, PROPELLER OR LIFTING SCREW FOR AIRCRAFT
Filed June 23, 1931    3 Sheets-Sheet 1
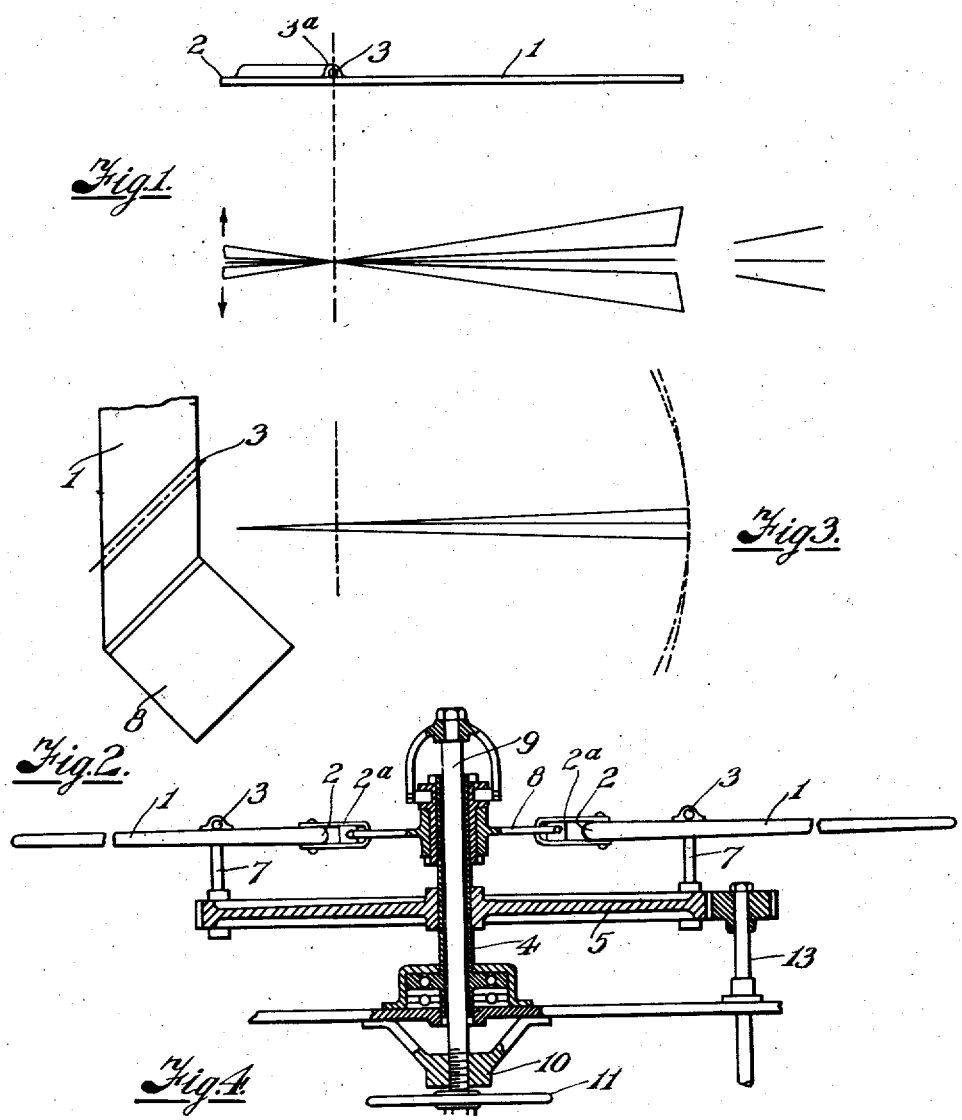
INVENTOR
Rudolph Chillingworth
BY
ATTORNEY Sept. 3, 1935. R. CHILLINGWORTH 2,012,988
ROTATING WING SYSTEM, PROPELLER OR LIFTING SCREW FOR AIRCRAFT
Filed June 23, 1931 3 Sheets-Sheet 2

INVENTOR
Rudolph Chillingworth
BY
ATTORNEY

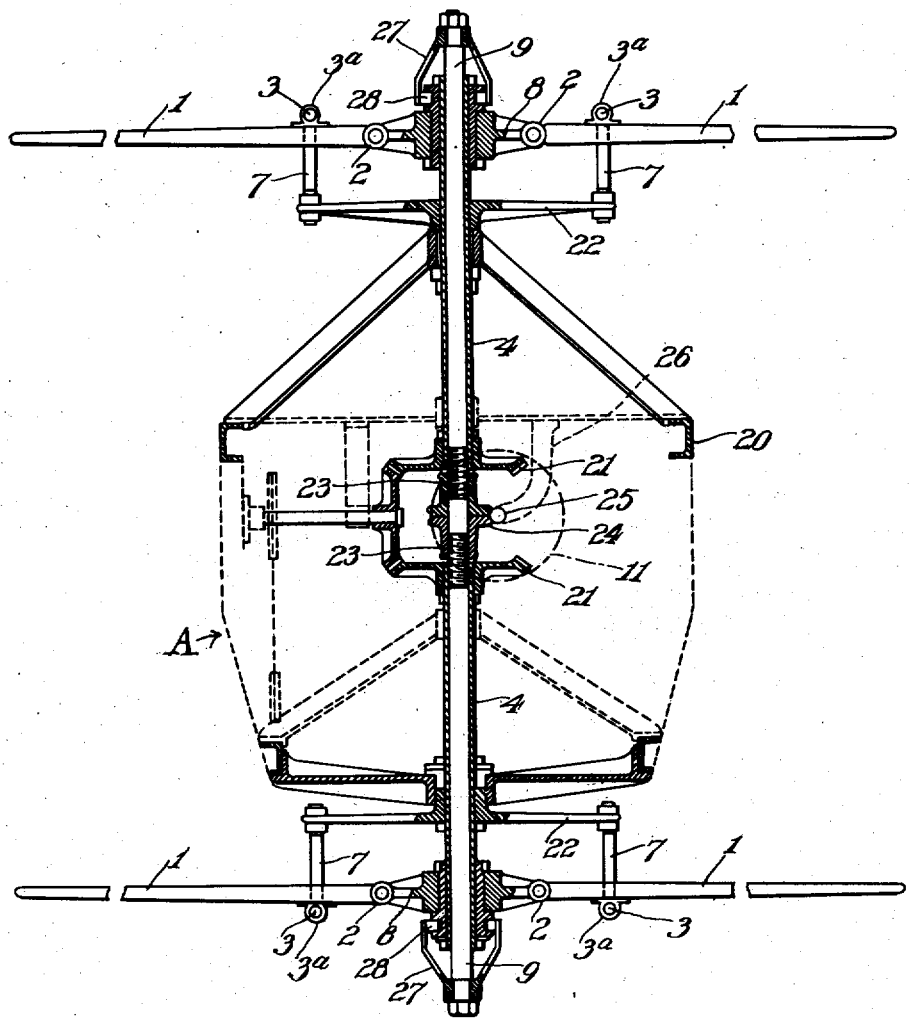

Patented Sept. 3, 1935

2,012,988

UNITED STATES PATENT OFFICE 2,012,988

ROTATING WING SYSTEM, PROPELLER, OR LIFTING SCREW FOR AIRCRAFT

Rudolph Chillingworth, Brooklyn, N. Y.

Application June 23, 1931, Serial No. 546,401
In Great Britain August 2, 1930

11 Claims. (Cl. 170—164)

This invention relates to improvements in rotating wing systems, propellers or lifting screws for aircraft.

The principal object of the invention is an improved rotating wing system or lifting screw comprising a plurality of wings, planes or blades which are obliquely pivoted with their major axes at an angle in respect of the axes about which they are adjustable, the said axes about which the planes, wings or blades are adjusted forming the sides of an angular figure having an even or odd number of sides, in the case of the angle being 45° said figure being a square. A change of pitch of the wings, planes or blades will be produced whilst utilizing the different circumferential speeds during adjustment of the ends of the edges of the wings, planes or blades which have different radii from the adjustment axis for the same angle of rotation.

A further object of the invention is to provide means for controlling these variations in effective pitch at the will of the pilot by the axial movements of a control element mounted to rotate with the wing system and attached to the roots or base ends of the wings, planes or blades by means of a square frame of axes and bearings for the blades.

Other objects of the invention are to provide combinations of two or more sets of rotating wing systems or lifting screws of variable pitch arranged to rotate in the same direction or in opposite directions about vertical axes and to provide aircraft having two such rotary systems arranged either both above the fuselage or body of the aircraft or one above and one below the same.

Several examples of rotary wing systems or lifting screws constructed and arranged in accordance with the invention are illustrated in the accompanying drawings in which:—

Figure 1 shows diagrammatically the change of pitch of a blade, plane or wing upon which the bearing is obliquely mounted when moved about its oblique axis.

Figure 2 shows diagrammatically the oblique mounting of one blade angled preferably at 45 deg. to a supporting square frame of axes.

Figure 3 shows diagrammatically the differing radii of points of an obliquely mounted wing whereby a difference of circumferential speed in the blade ends is obtained.

Figure 4 is a vertical sectional view of a rotary wing system constructed in accordance with the invention.

Figure 7 shows the invention with rotary wing or blade systems revolving in opposite directions with a common pitch control.

Figure 5:
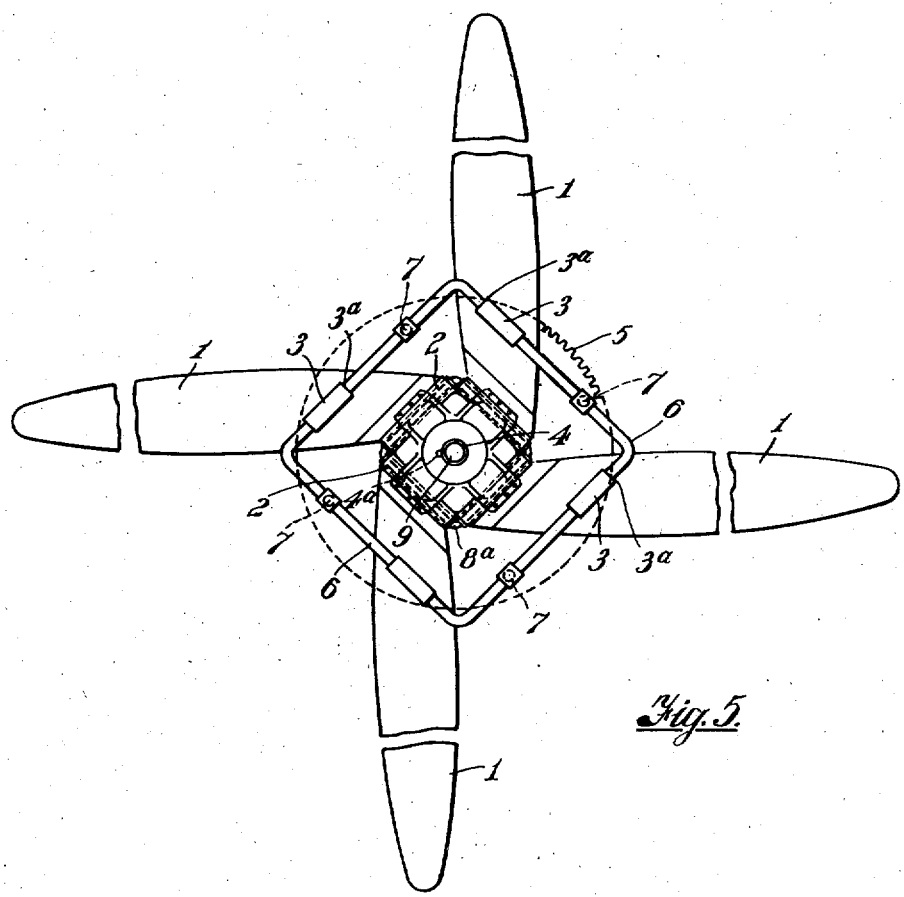
Figure 5 is a plan of Figure 4.

Referring to the drawings and to Figs. 1, 2 and 3 it will be observed that the bearings of the wing, plane or blade 1 (hereinafter referred to as the blade) are mounted obliquely on the said blades 1 and each of the blades with its bearing 3 is adjustably mounted on one of the axes which form the square frame of axes 6 (Fig. 5) which is called the outer square frame. There is a second inner square frame 8 of axes 8a (Fig. 5) bearings 2a mounted also on the blades 1 being pivoted on the axes 8a of the inner square frame 8. Further it will be observed in Figure 3 that the front and rear edges of the blade remote from the centre of rotation are situated at different radii and when adjustment of the blades about said ends will move at differing circumferential speeds and this difference is accentuated when adjustment of the blades is made about its axes 3.

As shown in Figures 4 and 5 of the drawings the rotary wing system is carried by a hollow rotary shaft 4.

A toothed wheel 5 is mounted fast on the shaft 4 and carries on posts or bars 7 upstanding from the wheel 5 a square tubular frame 6. This outer square frame 6 of which the tubular sides are the axes for the bearings 3 of the blades 1 which latter are adjustably mounted each to one of the said axes, the blades being disposed obliquely to the sides of the centre square frame 8 so as to provide the necessary oblique movement as explained with reference to Figs. 1 to 3.

The square control frame 8 formed by its axes 8a which latter are turnably mounted in bearings 2a on the ends 2 of the blades is similar in shape to the outer square frame 6 and has its sides parallel to the sides of the square 6.

The frame 8 carrying axes 8a is rotatably mounted by a spline 4a and axially mobile upon the hollow shaft 4. A screw spindle 9 passes concentrically through the hollow shaft 4 and engages at its lower end in a fixed nut 10.

A hand control wheel 11 is provided on the lower end of the spindle 9.

The toothed wheel 5 is driven by a pinion 12 mounted on a shaft 13 by any suitable motor.

Figure 6:
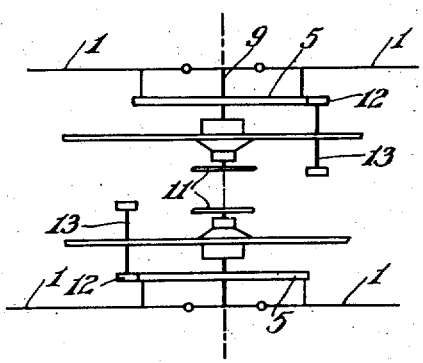
Figure 6 shows diagrammatically the application of the invention with the two air screws, each capable of individual pitch control.

By turning the handle control wheel 11 the pilot can cause the spindle 9 to move vertically thereby moving the inner square frame 8 and causing the blades with their oblique bearings 3 to turn on their oblique pivots so as to obtain a change of pitch as hereinbefore explained and shown in Figures 1 to 3. The varying distance between each pair of the corresponding axes resulting during adjustment of the blades will be equalized by mounting of a short piece of slide-way in which a quadratic slide piece is a sliding bearing each for one axis of the inner angular frame, mounted each to the inner end of the wings or blades. Two rotary wing systems as shown in Figure 6 and each with its own hand control wheel 11 may be mounted one above and one below the body of an aircraft and driven in the same direction.

Figure 7 shows diagrammatically and on a smaller scale two rotary wing systems or lifting screws mounted one above and one below the body A of an aircraft and driven in opposite directions by driving shafts 13 mounted out of alignment with the lifting screws.

Figure 5 is a plan of Figure 4 in which for the purpose of illustration the centre driving frame 8 has four sides with four wings, planes or blades 1 at a preferable angle of 45 deg. to the centre frame. The invention, however, is not limited in this respect inasmuch that three or more blades 1 may be used and the centre frame 8 may be triangular for three blades, square for two or four blades, pentagonal for five blades and so forth, the angle of mounting the axes 3 of the blades 1 being in every case parallel to the angle of the axis of the spider frame 8 concerned. The shifting of the frames 8 can also be done by joint connections to the frames below the wheel 5 instead of above.

In Figure 7 is illustrated a method of mounting a compound assembly of the invention in which the upper series of blades 1 revolve in the reverse direction to those below, and in which there is a method of pitch control common to both assemblies.

In this form the combined unit is mounted into the aircraft body 20, as shown, the rotary shaft 4 being divided into two sections, each being driven by bevel gear 21 as shown. In this form a plate 22 replaces the spur gear wheel 5 shown in Fig. 4, said plate 22 carrying the posts 7 for the axes 3. The centre shaft 9 is also divided, and the inner ends of this shaft have right and left handed threads 23 cut respectively engaging a rotary nut 24, likewise having two oppositely cut threads. The rotary nut 24 is externally worm toothed and moved by a worm wheel 25 through control wheel 11 supported by bracket 26. In order to convey axial motion from the shaft 9 to the spider frames 8, the outer ends of the shaft 9 carry arms 27 connected to a race 28 which enables the said inner race to rotate and move the frame of axes 8 axially. In operation, the blades 1 being set in motion through the gearing shown, the pilot may by actuating the hand wheel 11 alter the axial position of the frame of axes 8 on the driving shaft 4, and in so doing cause the blades to tilt and thereby change their pitch.

Having now particularly described and ascertained the nature of my said invention and in what manner the same is to be performed, I declare that what I claim is:—

1. A rotating wing, plane or blade system propellers or lifting screws for aircraft comprising a plurality of supporting axes formed as a frame of which each side serves as an axis upon which one of the wings, planes or blades is obliquely pivoted.

2. A rotating wing system propellers or lifting screws for aircraft comprising wings, planes, or blades, having a square rotary blade carrying frame, said frame being rotatively fast with a lower plate, wheel, or upon which latter are disposed pillars carrying the square frame forming bearings for the blades and the axes about which the wings, planes or blades are adjusted.

3. A rotating wing system propellers or lifting screws for aircraft comprising an outer square frame of axes mounted on a rotary driving support, a similar inner square frame of axes mounted to rotate concentrically with said outer frame and adjustable axially relatively thereto and a plurality of obliquely disposed wings, planes, or blades each of which is pivotally mounted on one of the axes constituting said outer square frame of axes with its major axis at an angle to the axis about which it pivots for pitch adjustment and is similarly pivoted at its root to the corresponding axis of said inner square frame of axes, each wing or blade of the system being thus supported by one axis of the outer frame and by the corresponding axis of the inner frame.

4. A rotating wing system propellers or lifting screws for aircraft, comprising a plurality of wings, planes or blades and a supporting angular structure formed by a plurality of axes to a frame for any necessary or desired number of wings planes or blades for the rotating system; the wings or blades pivoted obliquely with their major axes, each to one of the said axes for adjustment which latter extends in a transverse oblique direction across the blades and at an angle with respect to the said axes for adjustment, each of the said adjustment axes forming one side of the structural frame, which latter is secured rotatively fast by pillars to a rotary driving element and with its inner blade ends to a centrally mounted member to cause the wings or blades to turn around its axes to be adjusted for varying the pitch, while the system is in rotary motion, leaving an unobstructed passage of air through the centre of the system propellers or lifting screws.

5. In a rotating wing system, propellers or lifting screws, comprising a frame of which the sides form axes a plurality of pivotally mounted blades, each of which is obliquely pivoted with one axis of said frame, said axes extending obliquely across the longitudinal axes of said blades, the blades being adjustable around said axes of the frame by tilting the blades to change their pitch, for the purpose of varying the angle of incidence of the blades while in rotary motion.

6. In a rotating wing system propellers or lifting screws for aircraft, having a plurality of wings, planes or blades and a supporting angular structure formed by a plurality of axes to an open frame, for the necessary or desired number of wings or blades for the lifting screws or propellers, means to connect the wings or blades at an angle with their major axes, each to one of the said axes for adjustment, the said axes extend in a transverse oblique direction to the longitudinal axes across said wings or blades at an angle for pitch adjustment, each of the adjustment axes forming one side of the said structural frame, leaving an unobstructed passage of air through the center of the system, propellers or lifting screws.

7. An automatic slideway, supporting a sliding bearing suitable to the axes of the inner frame to equalize the varying distance during adjustment between each pair of the corresponding axes of the frames, mounted each with one of the axes of the inner frame to the inner end of the wings or blades.

8. In a rotating wing system, propellers or lifting screws, a structure consisting in two open frames of different size, the sides of which form axes, one of the frames surrounding the other and connected to a rotary driving element, a plurality of wings, planes or blades, each obliquely hinged, cooperative with one of its pivoting axes of the inner frame and obliquely hinged thereto each in cooperation with one of its pivoting axes of the axes of the other, the surrounding frame, all of the said axes of the frame, extending to one of the wings, planes or blades in a transverse oblique direction across the longitudinal axes of the wings or blades at an angle for pitch adjustment for the purpose of varying the angle of incidence of the wings or blades.

9. In a rotating wing system, propellers or lifting screws, a screwblade, an axis for said blade, and by means the screwblade obliquely pivoted with said axis in cooperation with the said blade, a plurality of the said axes, forming the sides of an angular structure to an open frame providing axes, around which the wings or blades are adjustable, said axes extending in a transverse oblique direction across the longitudinal axis of said wing or blade at an angle for pitch adjustment and said adjustment is being effected by means producing an axial movement of the wings or blades upwards or downwards from its horizontal plane.

10. In a rotating wing system propellers or lifting screws for aircraft, a plurality of wings, planes or blades and a doubly supporting angular structure formed by a plurality of axes to a pair of open frames of different size, means to connect the wings or blades obliquely, each in cooperation with one pair of the parallel axes of the said frames, situated always, each pair on one side of the said frames; the said axes extending by pairs and parallel one to the other in a transverse oblique direction across the longitudinal axis of one of the wings or blades for a double support for the blades against air-pressure caused by heavy load, the one blade axis obliquely pivoted towards the middle of the length of the blades forming the outer frame, firmly connected to a rotary driving element, the other axis obliquely pivoted with the inner end of the blade forming the inner frame and means to cause adjustment of the blades to change their pitch, when moved upwards or downwards from its horizontal plane to enable the screw to exert forceful action, capable for high portative power.

11. In a rotating wing system, propellers or lifting screws, as in claim 9, an automatic slideway, supporting a sliding bearing suitable to the axes of the inner frame to equalize the varying distance during adjustment between each pair of the corresponding axes of the frames, mounted each with one of the axes of the inner frame to the inner end of the wings or blades.

RUDOLPH CHILLINGWORTH.

CERTIFICATE OF CORRECTION.

Patent No. 2,012,988. September 3, 1935.

RUDOLPH CHILLINGWORTH.

It is hereby certified that error appears in the printed specification of the above numbered patent requiring correction as follows: Page 1, second column, after line 21, insert the syllable and words "ferent radial distances from such centre and the; and that the said Letters Patent should be read with this correction therein that the same may conform to the record of the case in the Patent Office.

Signed and sealed this 17th day of December, A. D. 1935.

(Seal)

Leslie Frazer
Acting Commissioner of Patents.

ing axes of the frames, mounted each with one of the axes of the inner frame to the inner end of the wings or blades.

8. In a rotating wing system, propellers or lifting screws, a structure consisting in two open frames of different size, the sides of which form axes, one of the frames surrounding the other and connected to a rotary driving element, a plurality of wings, planes or blades, each obliquely hinged, cooperative with one of its pivoting axes of the inner frame and obliquely hinged thereto each in cooperation with one of its pivoting axes of the axes of the other, the surrounding frame, all of the said axes of the frame, extending to one of the wings, planes or blades in a transverse oblique direction across the longitudinal axes of the wings or blades at an angle for pitch adjustment for the purpose of varying the angle of incidence of the wings or blades.

9. In a rotating wing system, propellers or lifting screws, a screwblade, an axis for said blade, and by means the screwblade obliquely pivoted with said axis in cooperation with the said blade, a plurality of the said axes, forming the sides of an angular structure to an open frame providing axes, around which the wings or blades are adjustable, said axes extending in a transverse oblique direction across the longitudinal axis of said wing or blade at an angle for pitch adjustment and said adjustment is being effected by means producing an axial movement of the wings or blades upwards or downwards from its horizontal plane.

10. In a rotating wing system propellers or lifting screws for aircraft, a plurality of wings, planes or blades and a doubly supporting angular structure formed by a plurality of axes to a pair of open frames of different size, means to connect the wings or blades obliquely, each in cooperation with one pair of the parallel axes of the said frames, situated always, each pair on one side of the said frames; the said axes extending by pairs and parallel one to the other in a transverse oblique direction across the longitudinal axis of one of the wings or blades for a double support for the blades against air-pressure caused by heavy load, the one blade axis obliquely pivoted towards the middle of the length of the blades forming the outer frame, firmly connected to a rotary driving element, the other axis obliquely pivoted with the inner end of the blade forming the inner frame and means to cause adjustment of the blades to change their pitch, when moved upwards or downwards from its horizontal plane to enable the screw to exert forceful action, capable for high portative power.

11. In a rotating wing system, propellers or lifting screws, as in claim 9, an automatic slide-way, supporting a sliding bearing suitable to the axes of the inner frame to equalize the varying distance during adjustment between each pair of the corresponding axes of the frames, mounted each with one of the axes of the inner frame to the inner end of the wings or blades.

RUDOLPH CHILLINGWORTH.

CERTIFICATE OF CORRECTION.

Patent No. 2,012,988.　　　　　　　　　　　　　　　　September 3, 1935.

RUDOLPH CHILLINGWORTH.

It is hereby certified that error appears in the printed specification of the above numbered patent requiring correction as follows: Page 1, second column, after line 21, insert the syllable and words "ferent radial distances from such centre and the; and that the said Letters Patent should be read with this correction therein that the same may conform to the record of the case in the Patent Office.

Signed and sealed this 17th day of December, A. D. 1935.

(Seal)　　　　　　　　　　　　　　　　　　　　Leslie Frazer
　　　　　　　　　　　　　　　　　　　　Acting Commissioner of Patents.